(12) United States Patent
Langer et al.

(10) Patent No.: US 7,634,445 B1
(45) Date of Patent: Dec. 15, 2009

(54) METHOD FOR BILLING INTERNET TRANSACTIONS VIA MOBILE RADIO TELEPHONE SERVICE

(75) Inventors: Michael Langer, London (GB); Patrik Ljungstrom, Konigswinter (DE); Michel Uwe, Bad Honnef (DE); Johann Reindl, Bonn (DE); Leonhard Schmickler, Bonn (DE); Ulrike Feuser, Bonn (DE); Walter Mohrs, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 1710 days.

(21) Appl. No.: 10/089,580

(22) PCT Filed: Sep. 28, 2000

(86) PCT No.: PCT/DE00/03420

§ 371 (c)(1),
(2), (4) Date: Jul. 31, 2000

(87) PCT Pub. No.: WO01/25979

PCT Pub. Date: Apr. 12, 2001

(30) Foreign Application Priority Data

Sep. 28, 1999 (DE) .................. 199 46 539

(51) Int. Cl.
*G06Q 40/00* (2006.01)

(52) U.S. Cl. .................. 705/40; 705/36 R; 705/38; 705/39

(58) Field of Classification Search .............. 705/36 R, 705/38, 39, 40
See application file for complete search history.

(56) References Cited

U.S. PATENT DOCUMENTS

| | | | | |
|---|---|---|---|---|
| 5,710,887 A | * | 1/1998 | Chelliah et al. | 705/26 |
| 6,067,529 A | * | 5/2000 | Ray et al. | 705/26 |
| 6,178,331 B1 | * | 1/2001 | Holmes et al. | 455/466 |
| 6,223,215 B1 | * | 4/2001 | Hunt et al. | 709/217 |
| 6,366,893 B2 | * | 4/2002 | Hannula et al. | 705/40 |
| 6,415,156 B1 | * | 7/2002 | Stadelmann | 455/466 |
| 7,089,208 B1 | * | 8/2006 | Levchin et al. | 705/39 |
| 2002/0065736 A1 | * | 5/2002 | Willner et al. | 705/26 |

FOREIGN PATENT DOCUMENTS

| | | |
|---|---|---|
| DE | 199 05 054 | 8/2000 |
| DE | 100 22 973 | 2/2001 |
| DE | 199 38 201 | 2/2001 |
| EP | 0 848 361 | 6/1998 |
| EP | 0 917 327 | 5/1999 |
| EP | 0 917 327 A1 * | 5/1999 |
| EP | 1 107 196 | 6/2001 |
| WO | WO 96/13814 | 5/1996 |

(Continued)

*Primary Examiner*—Harish T Dass
*Assistant Examiner*—Hatem Ali
(74) *Attorney, Agent, or Firm*—The Maxham Firm

(57) ABSTRACT

The invention relates to a method for billing internet transactions via mobile radio telephone service. By using WAP (Wireless Application Protocol), it is possible to select and, optionally, reserve goods and services (information, tickets, CD's, hotel rooms, etc) sold via the internet. When the customer decides to purchase the good or service, he or she conducts a payment transaction from the mobile radio telephone device. According to the invention, the customer data required for conducting a payment transaction is centrally maintained in a database of a payment gateway.

17 Claims, 2 Drawing Sheets

FOREIGN PATENT DOCUMENTS

| | | |
|---|---|---|
| WO | WO 97/41539 | 11/1997 |
| WO | WO 97/45814 | 12/1997 |
| WO | WO 98/11519 | 3/1998 |
| WO | WO 98/47116 | 10/1998 |
| WO | WO 99/31610 | 6/1999 |
| WO | WO 99/33034 | 7/1999 |
| WO | WO 99/45684 | 9/1999 |
| WO | WO 99/48312 | 9/1999 |

* cited by examiner

METHOD FOR BILLING INTERNET TRANSACTIONS VIA MOBILE RADIO TELEPHONE SERVICE

This invention relates to a method of accounting for Internet transactions via mobile wireless. Methods of accounting for Internet transactions via an Internet terminal (e.g., a personal computer) are known from the related art. Methods known previously for use on the Internet involve keeping or loading customer data in the Internet terminal or at the dealer's server. However, this is not feasible when using mobile wireless terminals as Internet terminals.

This invention is based on the following object (problem): Providing a method with which it is possible to rapidly and reliably bill for Internet transactions via mobile wireless.

This object is achieved for the features characterized in the independent patent claims.

By means of WAP (wireless application protocol) it is possible to select goods (information, tickets, CDs, hotel rooms, etc.) over the Internet by using a mobile wireless terminal and optionally reserve them. If the customer actually wants to purchase the goods, he can make a payment transaction from the mobile wireless device.

ADVANTAGES IN COMPARISON WITH THE RELATED ART

Methods known previously on the Internet have involved keeping or loading customer data in the terminal or at the dealer's server. The WAP terminal does not have enough capability for the first method, and for the second method, customer data must be entered again for each dealer. This is not feasible with a WAP terminal keyboard.

Sensitive data remains in a secured GSM network with the method according to this invention and is not transmitted over the Internet. Therefore, no additional encryption methods are necessary. In the GSM network, the customer is known from his or her MSISDN (Mobile Subscriber Integrated Services Digital Network) number. Therefore, no additional authentication method is necessary, and at the same time, it is possible to preserve the anonymity of the customer with respect to the provider or seller.

Figure 1:
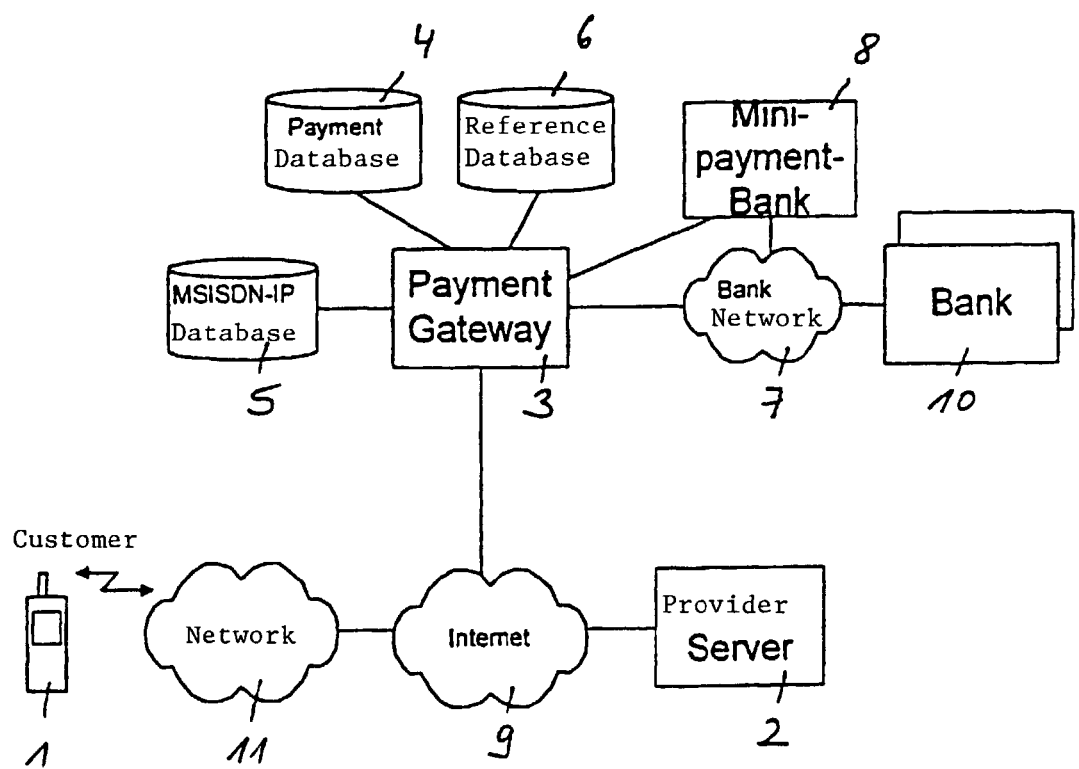
FIG. 1 shows an example of a system architecture according to this invention.

Four parties are involved in performing the payment transaction: customer, dealer, payment gateway and bank network.

The customer (WAP user) has a WAP-capable mobile wireless terminal 1 and has an access to the Internet 9 via the mobile wireless network 11.

The dealer has his standard Internet shop software in a provider server 2, expanded by a WML interface (wireless markup language interface) which allows the shop web pages to be displayed on the WAP-capable mobile wireless terminal 1. Payment gateway 3 holds customer data such as credit card information, debit information, minipayment and address information with respect to the customer's MSISDN in a payment database 4. The payment gateway 3 can determine by query to MSISDN-IP database 5 the MSISDN belonging to a temporary IP address. It also has access to various reference databases 6 for checking the customer data. The payment gateway 3 can forward credit card information and debit transactions to a bank network 7. Minipayment transactions are handled via a minipayment account with a mobile wireless operator-specific minipayment bank 8.

The minipayment account is carried as a subaccount of an actual bank account at a bank. Payment gateway 3 and minipayment account 8 are constantly being synchronized through database balancing. The minipayment account 8 may be paid in advance (prepaid) or it may be regulated by debiting (postpaid). The customer can access the current account status via the Internet 9 at any time and can access ongoing postings to the minipayment account 8. Deductions from minipayment account 8 to dealers' accounts with various banks 10 take place collectively over a period of time (e.g., by day, by week or by month).

Figure 2:
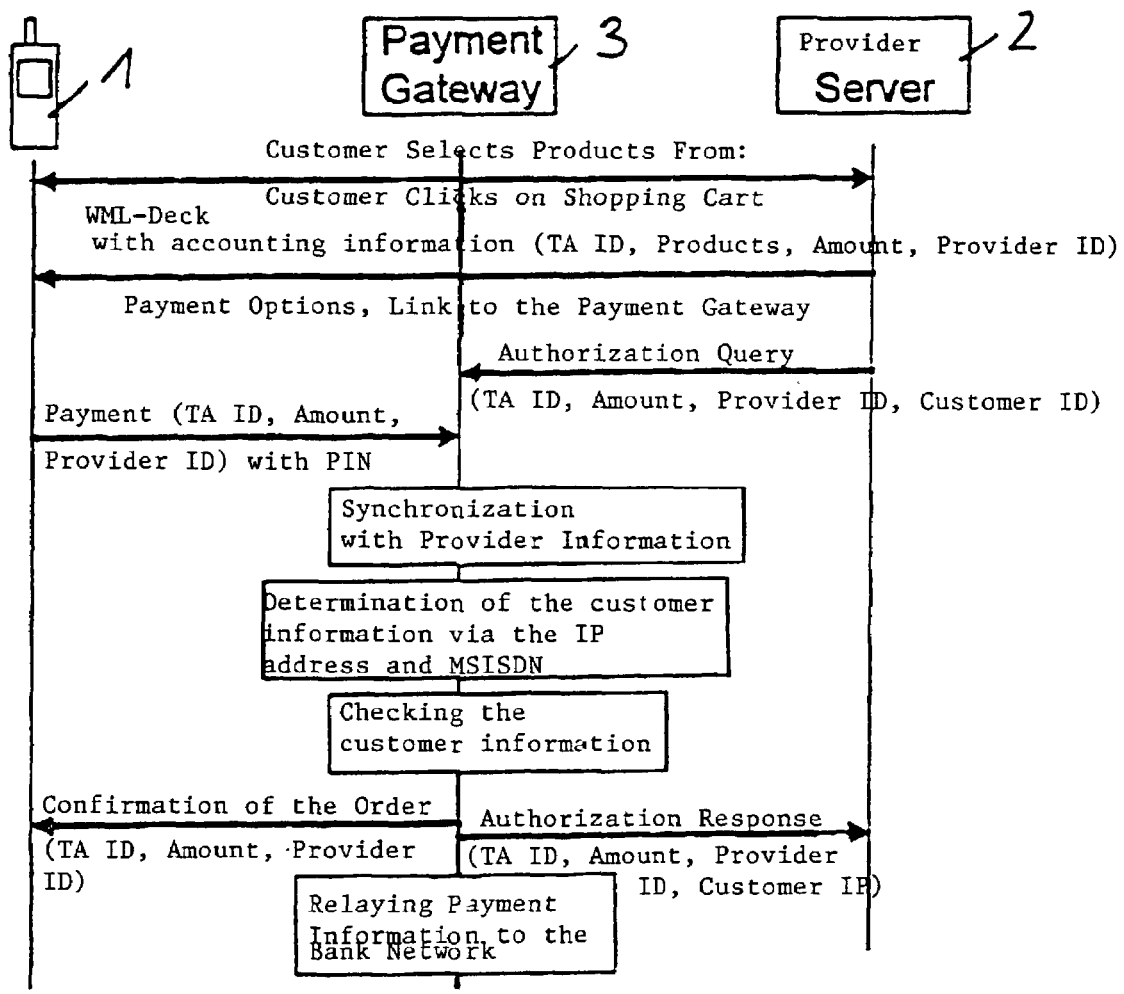
FIG. 2 shows an example of a payment transaction sequence.

Description of Process on the Basis of FIGS. 1 and 2:

The WAP user selects the WML shop page of a dealer's server 2 via his mobile telephone 1. The dealer's WML shop page appears on the display of the mobile telephone 1. The customer selects from available goods, which he would like to purchase, and places them in a virtual shopping cart at the dealer's server. Ultimately, the customer can see all the goods he has collected in his shopping cart. This selection procedure may lead, for example, to a certain music CD, a hotel room, theater tickets to a certain movie, etc. The dealer sees only an IP address issued temporarily to the mobile wireless subscriber, i.e., the customer is anonymous to the dealer. However, the dealer may determine the GSM network operator from the IP address range.

On the shopping cart WML page, the WAP user may review his entries so far and click on "pay." Then the dealer's server 2 transmits the transaction data (product information, purchase price, total purchase sum, a transaction ID (TA ID), his dealer ID, the payment options he supports and an IP link to the payment gateway) to mobile telephone 2 of the WAP user. At the same time, he also transmits this information directly to payment gateway 3. In doing so, he adds as customer identification the temporary IP address of the customer. The product information may be omitted here.

The WAP user reviews the information in the shopping cart and starts the payment procedure by selecting one of the available payment options. He may also terminate the payment process at this point. If he selects a payment option, the transaction data sent from the dealer (optionally without product information) is sent to payment gateway 3. In the case of larger amounts, input of a payment PIN, which is stored in payment gateway 3, may be required.

Payment gateway 3 synchronizes the two messages and checks them for whether they match. The user IP address, TA ID, amount and dealer ID must be identical. Via the user IP address, the payment gateway 3 determines the MSISDN of the WAP user and searches its customer data with it. It determines whether the data has been stored correctly for the selected payment option. Reference databases 6 are queried. If the result of this check is positive, the dealer and the WAP user each receive a payment confirmation. Payment gateway 3 makes a deduction from the minipayment account 8 online. Credit cards and debit entries are relayed later to the bank network 7 or a system with a connection to the bank network for execution. The payment gateway 3 writes an electronic invoice for the dealer for each transaction conducted. These are collected and sent to a accounting system for further processing.

If a shipping address was requested by the dealer in the transaction data, the WAP user may forward the data stored in payment gateway 3 or may give an address specifically for this payment process. This is then transmitted to the payment gateway together with the transaction data. The payment gateway forwards the special or preconfigured shipping address together with the payment confirmation to the dealer.

If no shipping address is necessary, as in the case of movie tickets, for example, the customer remains completely anonymous to the dealer.

Agreeing on payment options such as credit card or debit method may be simplified by the fact that the dealer must always support at least these two methods and the WAP user at least one of them. If more options are possible, it may be advisable for the dealer to inquire about the payment options at the payment gateway before sending the transaction data to the WAP user and only then would the dealer preset the payment options to be supported by the dealer in the transaction data.

The customer administers his own customer data in the payment database 4, e.g., via Internet access from a PC, via the WAP terminal or by written order.

The customer sets up his minipayment account 8 at the minipayment bank of the mobile wireless operator. This account is usually prepaid, unless the customer meets the credit requirements of the mobile wireless operator. The customer may make credit postings to his minipayment account at any time via the Internet and may also monitor the postings.

In cases where security requirements are lower, it is possible to simplify the method by making the authorization query to the payment gateway 3 asymmetrical, i.e., only the customer sends a message to the payment gateway or only the dealer sends a message to the payment gateway to initiate the payment transactions. No synchronization is necessary in these cases.

The invention claimed is:

1. A method of payment for goods or services on the Internet by means of a mobile wireless Internet terminal, the method comprising;
    initiating a payment transaction;
    providing a customer with access to a payment gateway via said mobile wireless Internet terminal, wherein said payment gateway is located by an IP address;
    allowing a provider access to said payment gateway via a server, wherein information about the customer is stored in said payment gateway;
    establishing a minipayment account in said payment transaction;
    transmitting from said server, as a provider message, transaction data including provider identification information, payment options supported by the provider, and the IP address of the payment gateway, to the customer's mobile wireless Internet terminal and also to said payment gateway;
    adding the customer's temporary IP address as customer identification;
    allowing the customer to review said transaction data and select a payment option;
    sending the transaction data, as a customer message to the payment gateway, said transaction data having been received by the customer from the provider;
    synchronizing said provider and customer messages in the payment gateway;
    comparing said provider and customer messages to determine whether they match;
    determining and checking the customer's Mobile Subscriber Integrated Services Digital Network (MSISDN) number and customer information on the basis of the customer's IP address; and
    performing a deduction from the minipayment account online if said provider and customer messages match.

2. The method according to claim 1, wherein no electronic financial information and no customer information is stored in said terminal after the transaction.

3. The method according to claim 2, further comprising the step of securing each payment transaction with a personal identification number (PIN).

4. The method according to claim 3, wherein sensitive data remains securely in the mobile wireless network and is not transmitted over the Internet.

5. The method according to claim 4, wherein no additional encryption methods are necessary.

6. The method according to claim 5, wherein no additional authentication method is necessary because the authentication of the customer is performed by the mobile wireless network.

7. The method according to claim 6, wherein the provider's server recognizes which GSM operator the customer belongs to on the basis of the IP address range.

8. The method according to claim 7, wherein the payment gateway generates an electronic invoice for the provider's account for each transaction performed.

9. The method according to claim 1, further comprising the step of securing each payment transaction with a personal identification number (PIN).

10. The method according to claim 1, wherein sensitive data remains securely in the mobile wireless network and is not transmitted over the Internet.

11. The method according to claim 1, wherein no additional encryption methods are necessary.

12. The method according to claim 1, wherein no additional authentication method is necessary because the authentication of the customer is performed by the mobile wireless network.

13. The method according to claim 1, wherein the provider's server recognizes which GSM operator the customer belongs to on the basis of the IP address range.

14. The method according to claim 1, wherein the payment gateway generates an electronic invoice for the provider's account for each transaction performed.

15. A method of payment for goods or services on the Internet by means of a mobile wireless Internet terminal, the method comprising;
    initiating a payment transaction;
    providing a customer with access to a payment gateway via said mobile wireless Internet terminal, wherein said payment gateway is located by an IP address;
    allowing a provider access to said payment gateway via a server, wherein information about the customer is stored in said payment gateway;
    establishing a minipayment account for said payment transaction;
    transmitting from said server, as a provider message, transaction data including provider identification information, payment options supported by the provider, and the IP address of the payment gateway, to the customer's mobile wireless Internet terminal and also to said payment gateway;
    adding the customer's IP address as customer identification;
    allowing the customer to review said transaction data and to select a payment option;
    sending the transaction data, as a customer message to the payment gateway, said transaction data having been received by the customer from the provider;
    synchronizing said provider and customer messages in the payment gateway;
    comparing said provider and customer messages to determine whether they match; and
    performing a deduction from the minipayment account online if said provider and customer messages match.

16. A method of payment for goods or services on the Internet by means of a mobile wireless Internet terminal, the method comprising;

establishing a minipayment account for a customer, wherein information about the customer's minipayment account is stored in a payment gateway;

initiating a payment transaction for the customer;

transmitting from a server to the customer's mobile wireless Internet terminal and also to said payment gateway, a provider message, including (a) transaction data including provider identification information and payment options supported by the provider, and (b) the IP address of the payment gateway;

to including the customer's IP address as customer identification in the provider message sent to the payment gateway;

sending to the payment gateway via the customer's mobile wireless Internet terminal, a customer message that includes said transaction data received by the customer from the provider and a payment option selected by the customer;

synchronizing said provider and customer messages in the payment gateway;

comparing said provider and customer messages to determine whether they match; and performing a deduction from the minipayment account online if said provider and customer messages match.

17. A method according to claim 16, wherein information about the customer is stored in the payment gateway, the method comprising:

via the customer's IP address, determining the customer's Mobile Subscriber Integrated Services Digital Network (MSISDN) number; and with the customer's MSISDN number, searching the stored customer information to determine whether the customer information has been stored correctly for the selected payment option.

* * * * *

UNITED STATES PATENT AND TRADEMARK OFFICE
CERTIFICATE OF CORRECTION

PATENT NO.        : 7,634,445 B1                                 Page 1 of 1
APPLICATION NO.   : 10/089580
DATED             : December 15, 2009
INVENTOR(S)       : Langer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2255 days.

Signed and Sealed this

Ninth Day of November, 2010

David J. Kappos
*Director of the United States Patent and Trademark Office*